US010740373B2

(12) United States Patent
Altaf et al.

(10) Patent No.: US 10,740,373 B2
(45) Date of Patent: Aug. 11, 2020

(54) DIALOG MECHANISM RESPONSIVE TO QUERY CONTEXT

(71) Applicant: INTERNATIONAL BUSINESS MACHINES CORPORATION, Armonk, NY (US)

(72) Inventors: Faheem Altaf, Pflugerville, TX (US); Lisa Seacat DeLuca, Baltimore, MD (US); Raghuram Srinivas, McKinney, TX (US); Rajendra G. Ugrani, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 15/427,109

(22) Filed: Feb. 8, 2017

(65) Prior Publication Data
US 2018/0225365 A1    Aug. 9, 2018

(51) Int. Cl.
| | |
|---|---|
| *G06F 16/33* | (2019.01) |
| *G06F 16/35* | (2019.01) |
| *G06F 16/9032* | (2019.01) |
| *G06F 40/20* | (2020.01) |

(52) U.S. Cl.
CPC ........ *G06F 16/334* (2019.01); *G06F 16/3344* (2019.01); *G06F 16/358* (2019.01); *G06F 16/90332* (2019.01); *G06F 40/20* (2020.01)

(58) Field of Classification Search
CPC .... G06F 17/27; G06F 16/3344; G06F 16/358; G06F 16/334
See application file for complete search history.

(56) References Cited

U.S. PATENT DOCUMENTS

| | | |
|---|---|---|
| 6,498,921 B1 | 12/2002 | Ho et al. |
| 7,516,113 B2 | 4/2009 | Horvitz et al. |
| 7,783,486 B2 * | 8/2010 | Rosser ................... G10L 13/00 704/270 |

(Continued)

FOREIGN PATENT DOCUMENTS

WO    WO2010105214 A2    9/2010

OTHER PUBLICATIONS

Peter Mell et al, The NIST Definition of Cloud Computing, National Institute of Standards and Technology, Publication 800-145, 2011.

(Continued)

*Primary Examiner* — Miranda Le
(74) *Attorney, Agent, or Firm* — Patrick J. Daugherty; Daugherty & Del Zoppo Co., LP (57) ABSTRACT

Aspects automatically invoke automated dialog chat bots in response to determining that query text content meets a threshold relevance. A computer processor analyzes different words within text content of a user query input to identify via natural language processing query topics defined by combinations of the words. The processor drives a display device to present an automated dialog chat bot to the user that presents a chat bot series of dialog questions in response to determining that a query topic identified from analyzing the text content meets a threshold relevancy; or searches a database for results that satisfy keywords or query topics of the query content in response to failing to identify a query topic for the query text content, or to determining that an identified query topic does not meet the threshold relevancy.

8 Claims, 5 Drawing Sheets

(56) References Cited

U.S. PATENT DOCUMENTS

| | | | |
|---|---|---|---|
| 7,996,462 B2* | 8/2011 | Degenhardt | G06Q 10/10 707/608 |
| 8,024,332 B2* | 9/2011 | Cao | G06F 16/338 707/728 |
| 8,166,173 B2* | 4/2012 | Low | G06Q 30/06 709/224 |
| 8,484,228 B2* | 7/2013 | Bhattacharyya | G06Q 10/10 707/754 |
| 8,495,051 B2* | 7/2013 | Kruglick | G06F 16/957 707/706 |
| 8,639,517 B2 | 1/2014 | Di Fabbrizio et al. | |
| 8,651,961 B2* | 2/2014 | Muller | A63F 13/45 463/42 |
| 8,799,000 B2* | 8/2014 | Guzzoni | G10L 15/22 704/270.1 |
| 8,818,926 B2* | 8/2014 | Wallace | G06N 5/047 706/47 |
| 8,935,277 B2 | 1/2015 | Kuchmann-Beauger et al. | |
| 9,386,113 B1* | 7/2016 | Goncharuk | H04L 67/26 |
| 9,396,264 B2* | 7/2016 | Liu | G06F 16/951 |
| 9,668,024 B2* | 5/2017 | Os | G06F 16/73 |
| 2005/0021652 A1* | 1/2005 | McCormack | H04L 12/1813 709/207 |
| 2007/0100790 A1* | 5/2007 | Cheyer | G09B 21/00 |
| 2010/0153094 A1* | 6/2010 | Lee | G06F 16/3329 704/9 |
| 2012/0016678 A1* | 1/2012 | Gruber | G10L 15/22 704/275 |
| 2014/0207882 A1* | 7/2014 | Joo | H04L 51/04 709/206 |
| 2014/0222433 A1* | 8/2014 | Govrin | G06Q 40/02 704/260 |
| 2014/0279050 A1* | 9/2014 | Makar | G06Q 30/0269 705/14.66 |
| 2015/0019220 A1* | 1/2015 | Talhami | G10L 15/063 704/244 |
| 2016/0180217 A1 | 6/2016 | Boston et al. | |
| 2016/0259775 A1* | 9/2016 | Gelfenbeyn | G06F 17/279 |
| 2016/0260433 A1* | 9/2016 | Sumner | G06F 16/3344 |
| 2016/0372116 A1* | 12/2016 | Summerfield | G10L 25/63 |
| 2017/0116982 A1* | 4/2017 | Gelfenbeyn | G10L 15/1815 |
| 2017/0132019 A1* | 5/2017 | Karashchuk | H04W 4/12 |

OTHER PUBLICATIONS

Ghose et al, Toward the implementation of a Topic specific Dialogue based Natural Language Chatbot as an Undergraduate Advisor, IEEE, 2013.

* cited by examiner

DIALOG MECHANISM RESPONSIVE TO QUERY CONTEXT

BACKGROUND

Natural Language Search and automated dialog or question and answer ("Q/A") systems (sometimes referred to as chat bots) may be deployed to assist users on electronic commerce (E-Commerce) web sites. Natural Language Search applications provide a type of computer human interface in web sites wherein relevant linguistic items such as verbs, phrases and clauses are extracted from a user's natural language query and then used to select associated data within the site. A natural language search engine attempts to find targeted answers to user questions expressed or implied by the words within a given query. Rather than merely searching for keywords within the search query and returning results matching the individual keywords, natural language processing attempts to identify a query, topic or question defined by a plurality of query words taken as a whole, as a function of considering keywords in combination with each other or as modified by verbs, adverbs, adjectives, subject clauses, etc., associated therewith, or in context of services or products offered on the web site hosting the query, and then search and return results that likely contain answer to the "question" or topic recognized as expressed or implied by the plurality of words in the query.

An automated dialog system is a type of conversational agent, a computer program designed to simulate an intelligent conversation with one or more human users via auditory or textual methods to answer a user's questions and guide a user through a given web site. Such programs are often designed to simulate how a human would behave as a conversational partner. They generally have higher rates of success and customer satisfaction when the domain of possible topics is more limited, relative to a more unlimited, universal domain of possible topics, as the questions posed in response to each user input is thereby more likely to be on point to the information sought by the user. Generally automated dialog systems are deployed for customer service and information acquisition from a particular line of products or services on a host web site. While some automated dialog system use natural language processing systems, it is generally faster and more efficient for such systems to scan for relevant keywords within a user input and return results from the site databases that are ranked in relevancy as a function of number of matching keywords, degree of similarity to a query wording pattern, etc.

BRIEF SUMMARY

In one aspect of the present invention, a computerized method for automatically invoking an automated dialog chat bot in response to query text content meeting a threshold relevance includes executing steps on a computer processor. Thus, a computer processor analyzes different words within text content of a user query input to identify via natural language processing query topics defined by combinations of the words. In response to determining that a query topic identified from analyzing the text content meets a threshold relevancy, the processor invokes an automated dialog chat bot, driving a display device to present an automated dialog chat bot to the user within a graphical user interface structure that presents a chat bot series of dialog questions that are each selected in response to answer inputs from the user via the graphical user interface to a previous question in the chat bot series of dialog questions. Alternatively, the processor searches a database for results that satisfy the keywords or query topics identified for the query input text content, in response to failing to identify a query topic from analyzing the query text content via natural language processing, or in response to determining that an identified query topic does not meet the threshold relevancy.

In another aspect, a system has a hardware processor in circuit communication with a computer readable memory and a computer-readable storage medium having program instructions stored thereon. The processor executes the program instructions stored on the computer-readable storage medium via the computer readable memory and thereby analyzes different words within text content of a user query input to identify via natural language processing query topics defined by combinations of the words. In response to determining that a query topic identified from analyzing the text content meets a threshold relevancy, the processor invokes an automated dialog chat bot, driving a display device to present an automated dialog chat bot to the user within a graphical user interface structure that presents a chat bot series of dialog questions that are each selected in response to answer inputs from the user via the graphical user interface to a previous question in the chat bot series of dialog questions. Alternatively, the processor searches a database for results that satisfy the keywords or query topics identified for the query input text content, in response to failing to identify a query topic from analyzing the query text content via natural language processing, or in response to determining that an identified query topic does not meet the threshold relevancy.

In another aspect, a computer program product for automatically invoking an automated dialog chat bot in response to query text content meeting a threshold relevance has a computer-readable storage medium with computer readable program code embodied therewith. The computer readable hardware medium is not a transitory signal per se. The computer readable program code includes instructions for execution which cause the processor to analyze different words within text content of a user query input to identify via natural language processing query topics defined by combinations of the words. In response to determining that a query topic identified from analyzing the text content meets a threshold relevancy, the processor is caused by the instructions to invoke an automated dialog chat bot, driving a display device to present an automated dialog chat bot to the user within a graphical user interface structure that presents a chat bot series of dialog questions that are each selected in response to answer inputs from the user via the graphical user interface to a previous question in the chat bot series of dialog questions. Alternatively, the processor is caused by the instructions to search a database for results that satisfy the keywords or query topics identified for the query input text content, in response to failing to identify a query topic from analyzing the query text content via natural language processing, or in response to determining that an identified query topic does not meet the threshold relevancy.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
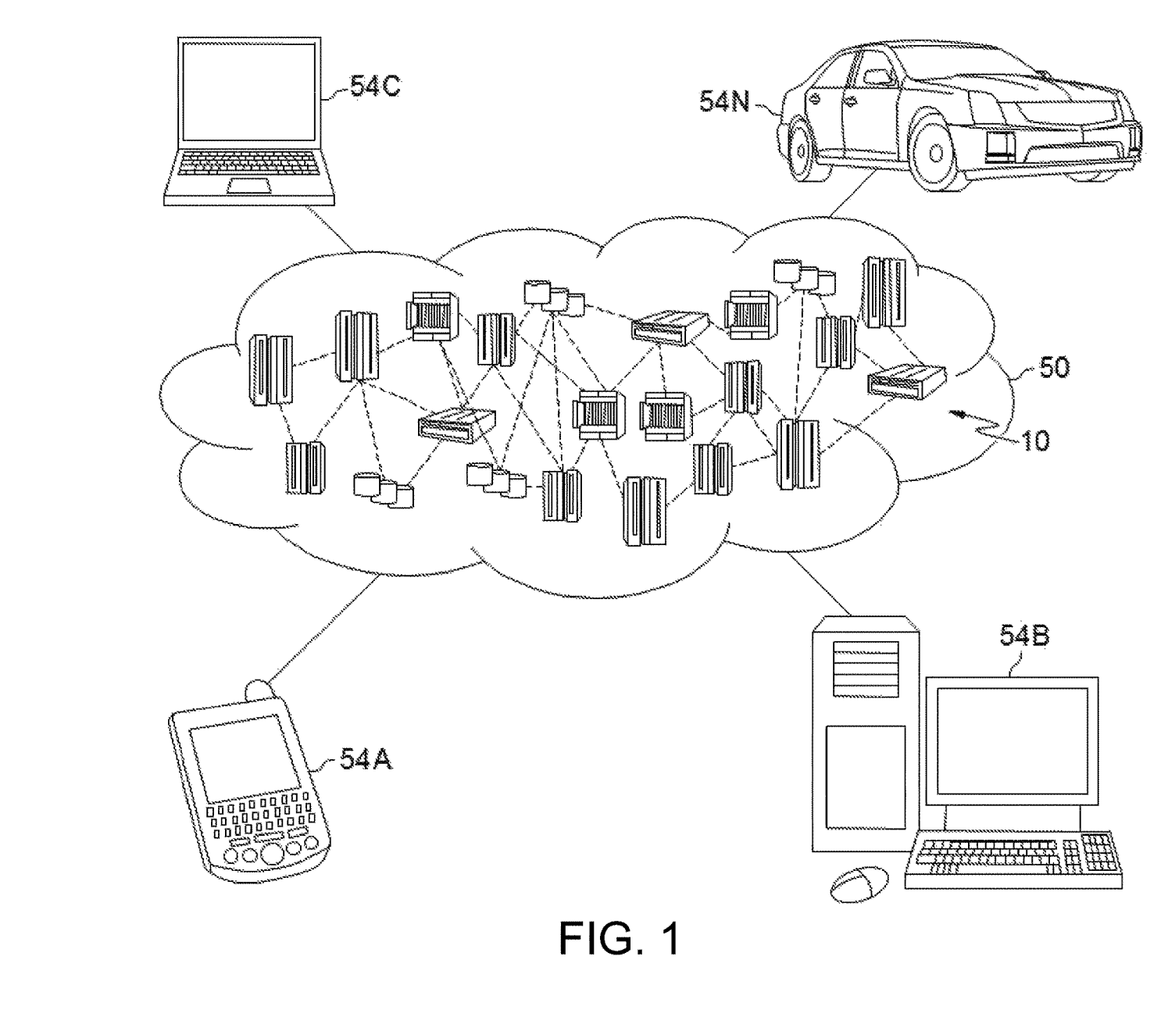
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
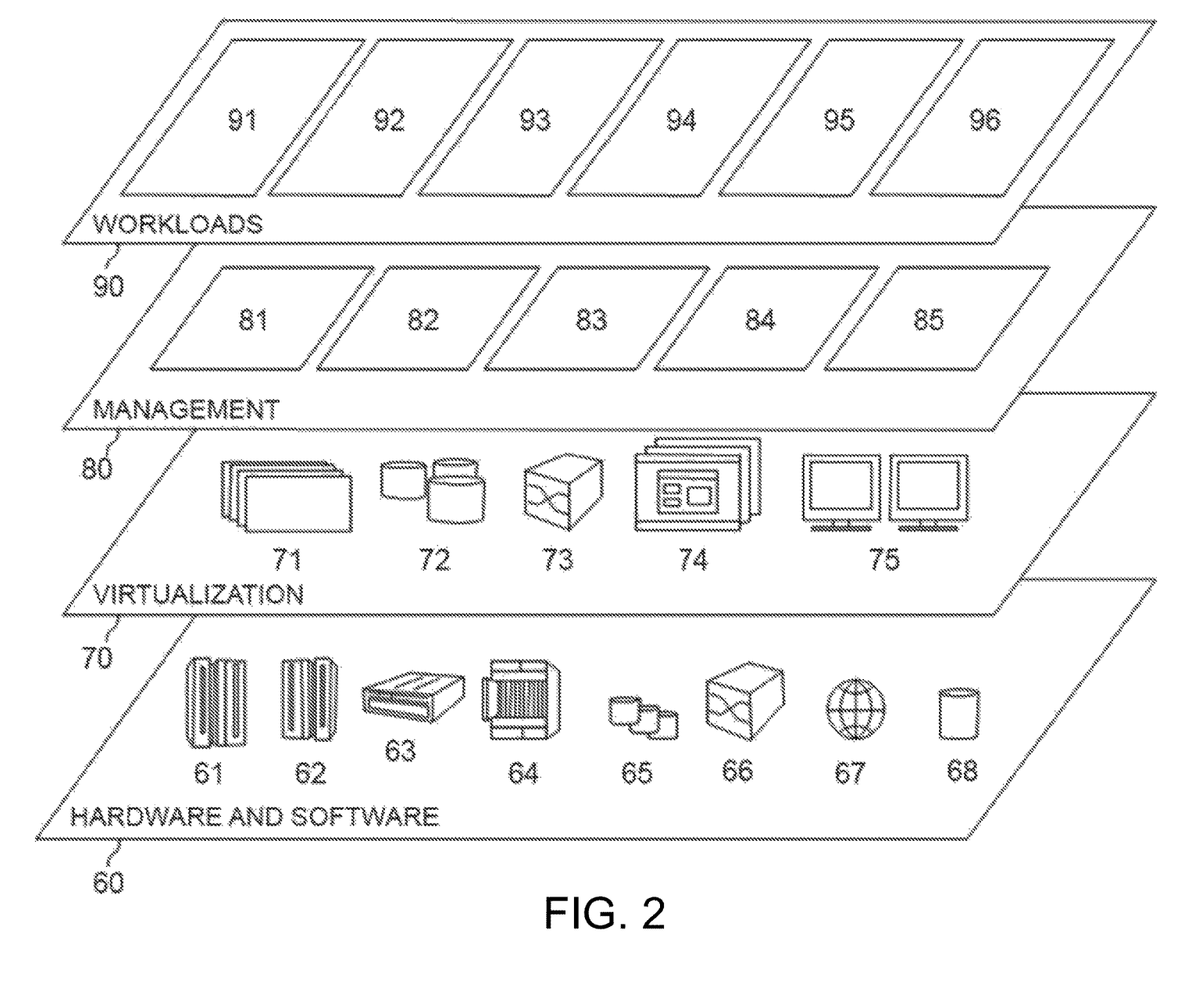
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
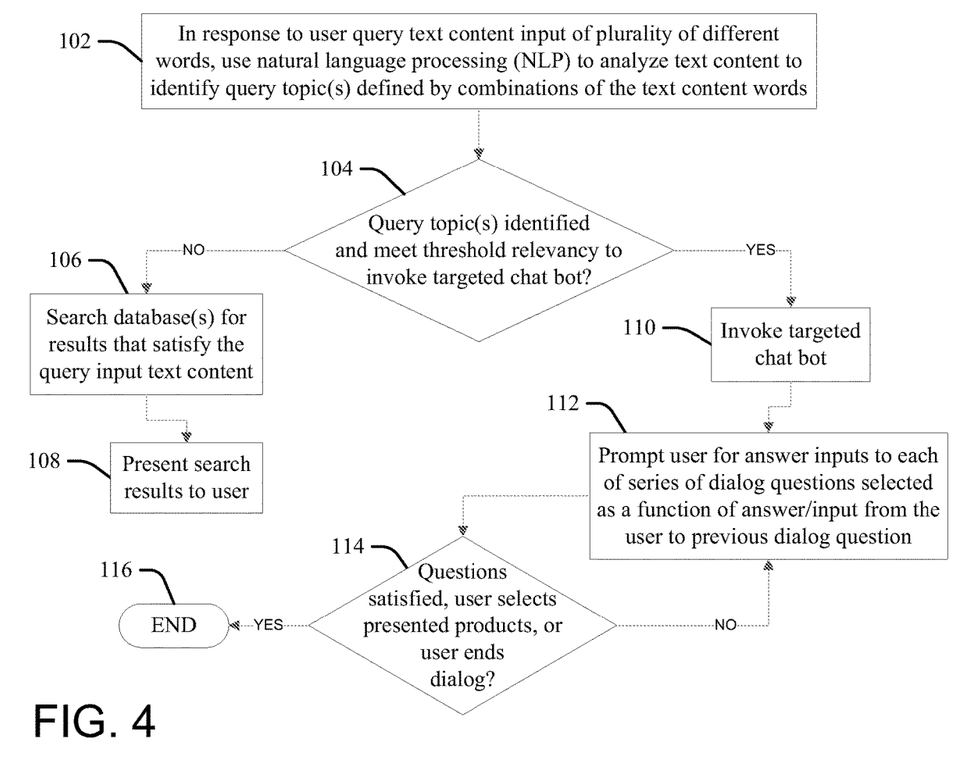
FIG. 4 is a flow chart illustration of an embodiment of the present invention.
Figure 5:
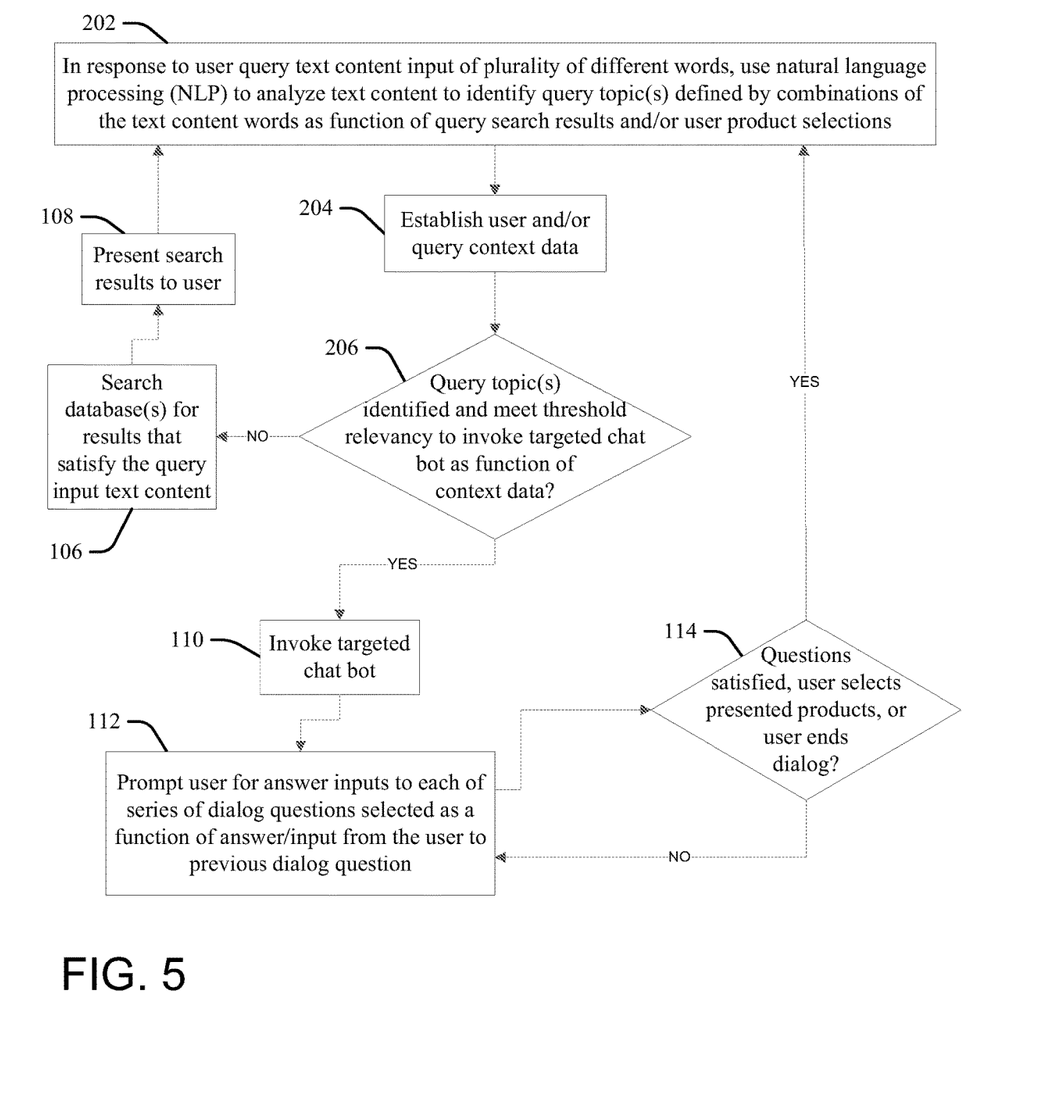
FIG. 5 is a flow chart illustration of another embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 to execute the process steps or system components or tasks as depicted in FIG. 4 or 5 as described more fully below.

Figure 3:
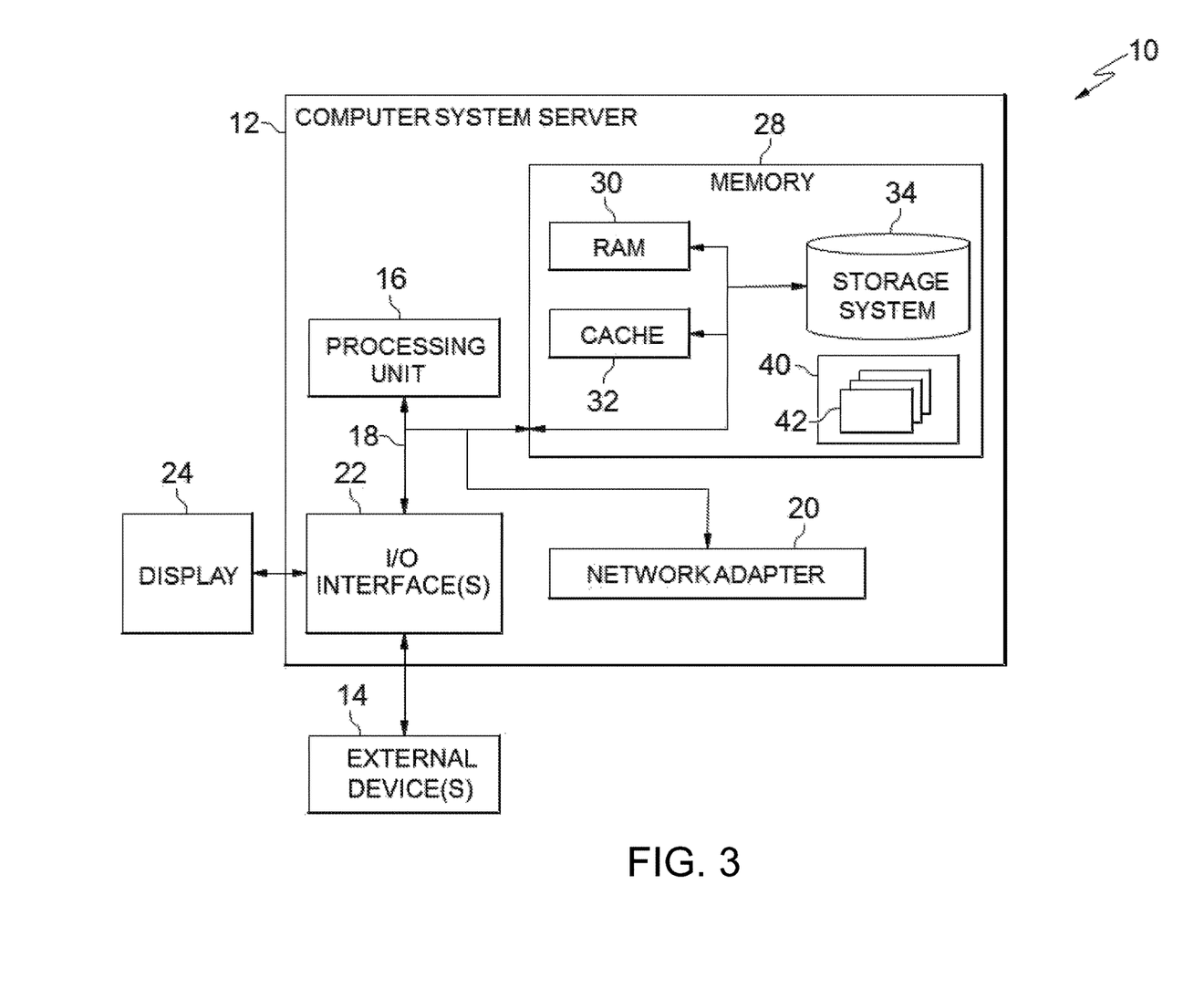
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 4 illustrates a process or system according to the present invention that automatically invokes a targeted automated dialog chat bot in response to query text content meeting a threshold relevance to a topic. At 102, in response to an input of a user query text content comprising a plurality of different words, a processor that is configured according to an aspect of the present invention (the "configured processor") uses natural language processing (NLP) to analyze the text content to identify one or more query topics defined by combinations of the text content words. For example, the NLP may consider keywords identified in the text content in combination with each other, including as modified by verbs, adverbs, adjectives, subject clauses, etc., associated therewith (via sentence structure conventions).

At 104 the configured processor determines whether any query topics identified at 102 meet a threshold relevancy defined for invoking an automated dialog system (virtual assistant system, "chat bot," etc.) that is targeted to one or more products (goods or services) of a service provider hosting a web site receiving the input of the user query text content, or is otherwise associated with the configured processor (the "targeted chat bot"). More particularly, the targeted chat bot comprises a plurality of questions that are provided in a dialog window to the user (via a graphical user interface (GUI)) and linked to each other on a precedential basis by answers or choice inputs from the user, and wherein the questions and answers are associated with and targeted to specific products of the service provider that may satisfy issues identified by answers of the user to questions posed by the automated dialog system. The threshold relevancy defines criteria that indicate that the input query is related to such service provider products.

In response to a negative determination at 104 (no identified query topics are identified, or none of the identified topics meet the threshold relevancy), then at 106 the configured processor system searches one or more databases in circuit communication therewith for results that may satisfy the query input text content, for example responding with a list of articles or goods or services that match keywords or topics determined for the search input query, ranked in order or strength of correlation to the keywords or topics, etc. At 108 the configured processor presents the results of the search to the user (for example, driving a display device to display the results via a GUI interface display).

Otherwise, if an identified query topic meets the threshold relevancy at 104, then at 110 the configured processor invokes the targeted chat bot dialog associated with the threshold relevancy and thereby functions as a virtual assistant system: at 112 prompting the user with further answer inputs to each of a series of questions related to each other in a dialog structure, wherein subsequent questions are selected as a function of answer inputs from the user to a previous question, until at 114 no more unasked questions remain unsatisfied by user answers or inputs, the user selects suggested products presented in the dialog display in association with the dialog questions, or the user otherwise ends the dialog (for example, closing a window presenting the series of dialog questions), and the process ends at 116. Thus, the configured processor iteratively engages the user in a dialog at 112-114 that is driven by the question and answer structure of the dialog system, and which may then optimally lead to a selection by the user of products presented by the targeted chat bot.

Illustrative but not limiting or exhaustive examples of failing to meet the threshold relevancy at 104 include a failure to understand or find any topic within or derived from the query text content, wherein the searching at 106 relies upon keyword, phrase or other word matching algorithms; and identifying topics that do not match topics associated with the dialog system questions within a threshold likelihood (for example, the topics are unrelated, and therefore any of a set of specific goods or services recommendations that may be provided by the dialog system are unlikely to satisfy a query topic identified at 102.

Prior art NLP search mechanisms enable an end user to enter searches in natural language formats, wherein such search mechanisms try to understand a topic, intent or other context defined by the natural language input and thereby respond with a list of articles, products, etc. that match the topic, intent or other context determined for the search input. Prior art virtual assistant systems are generally evoked in response to a user explicitly providing an input that requests initiation of a dialog with a chat bot or other virtual assistant machine, or confirms a suggestion by a service provider to launch such a dialog (for example, as triggered by a dwell time of the user on a particular web page exceeding a threshold time). In contrast to the prior art, aspects of the present invention combining NLP searching and chat bot dialog mechanisms into a unified system that autonomously launches chat bots as a function of comparing query content to relevancy thresholds, providing a distinct experience where the end user can search using natural language and also have a virtual assistant, in some aspect based on such searches or results therefrom, can proactively initiate a dialog with the end user.

In one example of an implementation of the process or system of FIG. 4 the user inputs a query comprising the text string "I have a stain on my carpet." In a conventional, prior art search engine for a commerce site of a service provider, a search is executed for products having descriptions or metadata tags that match one or more words within the query, which may return a list of products offered by the service provider that may be relevant to the query (for example, carpet goods for sale, stain removers, cleaning services, carpet cleaners, etc.).

In contrast, aspects of the present invention analyze the query at 102 and identify query topics from a combination of keywords "stain" and "carpet" as modified by the clause with the verb "have" and possessive pronoun "I" to a plurality of possible topics that are associated with a given chat bot series of questions ("chat bot topics") that include "stain removal request," "stain removal how-to," "carpet retail sale inquiry" and "carpet warranty service inquiry."

Thus, comparing determined query topics to chat bot topics at 104 invokes a dialog chat bot at 110 as a function of matching the topics with a threshold relevancy precision, such as likely matching or unlikely matching. For example, where the threshold at 104 is a likelihood of match of a "stain removal request" topic determined at 102 to the chat bot topic "carpet cleaning service" associated with a first series of chat bot questions, the configured processor determines that the topic match is likely at 104 and invokes the presentation of the first series of questions at 110, presenting at 112 via a chat bot dialog box an initial question of the first series: "Do you want to fix the stain?" Where the threshold at 104 is a likelihood of match of a "carpet warranty service inquiry" topic determined at 102 to the chat bot topic "warranty claims" associated with a second series of chat bot questions, the configured processor determines that the topic match is likely at 104 and invokes the presentation of the second series of questions at 110, presenting at 112 via a chat bot dialog box an initial question of the second series: "Are you submitting a warranty claim on you carpet?".

Where a plurality of matches of query topics to chat bot topics meet a defined threshold relevance standard (each are likely matches), the configured processor may rank the matches as a function of strength of matching likelihood and choose a query topic-chat bot topic match having the highest likelihood to invoke in dialog with the user at 110. Some embodiments may rank or weight said query topic-chat bot topic matches by value of the chat bot topic to the service provider, for example choosing a chat bot topic focused on selling a higher value product over another, or weighting a higher value chat bot topic to increase its likelihood of match value to meet the threshold when it is within a specified tolerance value (for example, adding 10% to its value, so that a 40% likelihood, otherwise determined to be "unlikely" when compared to a 50% likelihood threshold, meets said threshold.

In contrast, where the threshold at 104 is a likelihood of match of either the determined "stain removal request" topic or "carpet warranty service inquiry" topic to a chat bot topic "air conditioning service or sales" that is associated with a third series of chat bot questions, the configured processor determines that a topic match is unlikely at 104 and responsively triggers a keyword search at 106, without evoking a dialog chat bot presentation at 110 of the third series of questions. Thus, aspects of the present invention proactively invoke a dialog box interaction to occur only when determined with requisite confidence that the user search query is related to the series of questions posed by the chat bot.

FIG. 5 illustrates an alternative embodiment of the present invention wherein at 202 a processor configured according to an aspect of the present invention (the "configured processor") uses natural language processing to analyze text content words of a user query to identify query topics defined by combinations of the text content words as a function of a specific service provider hosting a data field receiving the query input, and of any prior search results or product selections by the user from previous iterations of the process, as is described more fully below. (Elements sharing common numerical identifiers with the embodiment of FIG. 4 are generally described above with respect to FIG. 4.) In this embodiment, the configured processor makes topic identifications from a limited set (context, universe) of topics associated with products of the service provider. In one aspect, the limited universe is applied under an assumption that the user is using the present input field provided by or associated with the service provider under an expectation that satisfactory results will be limited to products of the service provider.

In one example implementation of the embodiment of FIG. 5 the service provider is an insurance company that sells casualty policies, wherein for the query text string input of "What if I have a stain on my carpet?" the configured processor determines at 202 that the query topic is likely a "loss claim" to receive compensation to clean or replace the carpet; "loss mitigation," to receive information on self-help measures (cleaning products, stain removal techniques, etc.) to help the user cure the problem and avoid filing a claim for compensation to replace the carpet; "policy quote," to receive a quote for an insurance policy that would compensate the user in the event that their carpet is damaged through fire, broken water pipes, flooding, general natural disaster damage or other covered events defined by the policy; and still other examples will be apparent to one skilled in the art.

At 204 the configured processor establishes context data that is applicable to identified query topics for the user query as a function of products of the service provider. Thus, context data may include time data used for establishing beginning and end calendar dates or times of day of any retail promotional sales event offered by the service provider and applicable to the entry time or day of the user query, including as limited to a geographical region of the user's home or business address, or excluded based on said address. Seasonal promotions may be applicable to (or foreclosed from) the time or day of the query input, for example special cleaning supplies or services offered during a "spring cleaning" time period defined by the service provider. A service provider may set the configured processor to engage customers via a chat bot if they are searching for emergency lights or related items only during a tornado season, or searching for patio furniture or related items only during a spring season promotional season. Such time data may also be used to determine threshold relevance for insurance service provider domains with respect to promotions available to policy holders having a claim filing history of the user, such as no claims within three years, only one claim within five years, etc.

The configured processor may also compare the user context data to data associated with a disqualifying event, and to responsively determine that the topic fails to meet a relevancy threshold, or meets a relevancy threshold for a specific topic related to the disqualifying event. For example, in the case of an insurance company service provider, the configured processor may determine if any flooding, fires, or other events known to generate policy holder losses have occurred within a time period at the geographic location of the user that includes the query input date and/or time, and if so determine that the user is not eligible for a quote for new coverage, and thereby that the user query topic fails to meet the threshold for triggering a chat bot that presents questions leading to a purchase of new insurance coverage.

Accordingly, at 206 the configured processor determines whether any query topics identified at 202 meet a threshold relevancy defined for invoking an automated chat bot dialog system targeted to a product of the service provider as a function of the user context data determined at 204. Thus, while a topic of "policy quote" determined at 202 by the configured processor for the policy query text string input of "What if I have a stain on my carpet?" would generally meet a threshold match to a topic of "customer request for policy quote" topic associated with a series of chat bot questions, and trigger invoking of the chat bot with said questions at step 110 of FIG. 4. Here the user context established at 204 indicates that the residence address of the user is within a flood zone recently impacted by major flooding through heavy rainfall, and therefore that the user likely cannot purchase flood insurance at this time. Accordingly, the configured processor determines at 206 that the "policy quote" topic determined for the query at 202 fails to meet the requisite threshold to trigger invoking the "customer request for policy quote" chat bot questions series at 110, as a function of the recent flooding condition context data established at 204.

The embodiment of FIG. 5 also uses a feedback loop structure to iteratively repeat the step of determining the topic for the search query text content at 202 as a function of additional data: the identification of any product selected by the end user from results presented at 108 from a database search at 106 in a prior iteration of the process, or suggested and presented in a dialog display in association with the dialog questions evoked in a prior chat bot iteration at 110, 112 and 114. In one example the service provider is a cleaning supplies retailer, and the configured processor determines at 202 that the topic of the query text string input of "What if I have a stain on my carpet?" is "stain remover purchase," resulting in a user selection of a stain removal product associated with a chat bot question presented to the user at 114. In a subsequent iteration of step 202 the configured processor determines an updated topic for the query text string input of "What if I have a stain on my carpet?" is "brush purchase," in response to recognizing that the user has inquired to purchase the stain remover, and that historical context data established for the user at 204 (purchase history of other users sharing similar demographic data, or located within a same residential zip code, etc.) indicates that purchasers of the stain remover usually also purchase a brush designed for cleaning carpets as well. Thus, a subsequent iteration of the process at 206 now triggers a different chat bot series of questions at 110 targeted to selling the brush to the user.

Embodiments of the present invention enable an end user to have a conversation with a dialog system via the chat bot interactions, and some embodiments gather more information about the user from each chat bot answer or response that is used to both identify topics (at 202, FIG. 5) and determine topic matching (at 206, FIG. 5). Search results may be appropriately prioritized in response to answers to progressively more personalized questions. Prior art search engine techniques lack this sort of proactive exchange with the end user, and traditional conversation engine comes into action only when a user intentionally initiates interaction. Aspects of the present invention training a conversational engine to understand search terms and topics determined therefrom and autonomously start chat bot dialog interactions only when appropriate (relevant) to a topic or context of the query. This approach enables some systems of the present invention to respond with chat bot dialogs only when it fully and wholly understands that the query is relevant to the topic of the chat bot questions. This approach enables service providers to train virtual assistants and deploy them in iterations of additional functionality, and to deploy additional logic for determining when a proactive dialog can be autonomously launched.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically invoking an automated dialog chat bot, comprising executing on a computer processor the steps of:

in response to an input of a user query text content comprising a plurality of different words, analyzing the text content to identify via natural language processing query topics defined by combinations of words and a sentence structure of the text content, comprising making query topic identifications from a limited set of chat bot topics that are each associated with products of a service provider;

in response to determining that a query topic is identified from the analyzing the text content, determining whether the identified query topic likely matches each of a plurality of different chat bot topics that are associated one each with each of different series of dialog questions;

ranking each of a plurality of ones of the different chat bot topics that are determined to likely match the identified query topic as a function of different relative values of strength of match of the identified query topic to the ones of the different chat bot topics and to service provider product values that are associated to the ones of the different chat bot topics, wherein the different relative values of strength of match are weighted to more highly rank the ones of the different chat bot topics that are associated to higher service provider product values;

determining that a highest ranked one of the ranked chat bot topics meets a threshold likelihood of matching chat bot topics defined for invoking an automated dialog chat bot;

searching a database for results that satisfy keywords in the query input text content or the query topics identified for the query input text content, in response to failing to identify a query topic from analyzing the text content via natural language processing, or in response to determining that the identified query topic does not likely match any of the plurality of different chat bot topics associated with the different series of dialog questions;

in response to determining that the highest ranked one of the ranked chat bot topics meets the threshold likelihood of matching chat bot topics, presenting an automated dialog chat bot on a display device within a graphical user interface structure; and presenting in series from the automated dialog chat bot a plurality of dialog questions comprising ones of the series of dialog questions associated to the highest ranked one of the ranked chat bot topics and that are selected in response to answer inputs via the graphical user interface to a previous question in the presented series of dialog questions.

2. The method of claim 1, wherein the determining that the highest ranked one of the ranked chat bot topics meets the threshold likelihood comprises a step that is selected from the group consisting of:
 determining whether time data of the input of the input query text content is within a promotional sales event period for a service provider product, wherein the time data of the input is selected from the group consisting of: a time of day, and a calendar date;
 determining whether a geographic location of the user is located within a geographical region that is associated with a geographic region-dependent value for a service provider product, wherein the geographic location of the user is selected from the group consisting of: a home address of the user, and a business address of the user; and
 determining whether the geographic location of the user meets a threshold qualification for matching the chat bot topic as a function of comparing the time data of the input of the user query text content to a time period of a disqualifying event, wherein the geographic location of the user is selected from the group consisting of: a home address of the user, and a business address of the user.

3. The method of claim 1, wherein the series of dialog questions target aspects of a product of a service provider as a solution to the identified query topic.

4. The method of claim 1, wherein the step of analyzing the text content to identify query topics defined by combinations of words and the sentence structure of the text content further comprises:
 making the query topic identifications from a limited set of chat bot topics that are each associated with products of a service provider.

5. A system, comprising:
 a processor;
 a computer readable memory in circuit communication with the processor; and
 a computer readable storage medium in circuit communication with the processor;
 wherein the processor executes program instructions stored on the computer-readable storage medium via the computer readable memory and thereby:
 in response to an input of a user query text content comprising a plurality of different words, analyzes the text content to identify query topics via natural language processing that are defined by combinations of words and a sentence structure of the text content, comprising making query topic identifications from a limited set of chat bot topics that are each associated with products of a service provider;
 in response to determining that a query topic is identified from the analyzing the text content, determines whether the identified query topic likely matches each of a plurality of different chat bot topics that are associated one each with each of different series of dialog questions;
 ranks each of a plurality of ones of the different chat bot topics that are determined to likely match the identified query topic as a function of different relative values of strength of match of the identified query topic to the ones of the different chat bot topics and to service provider product values that are associated to the ones of the different chat bot topics, wherein the different relative values of strength of match are weighted to more highly rank the ones of the different chat bot topics that are associated to higher service provider product values;
 determines that a highest ranked one of the ranked chat bot topics meets a threshold likelihood of matching chat bot topics defined for invoking an automated dialog chat bot;
 searches a database for results that satisfy keywords in the query input text content or the query topics identified for the query input text content, in response to failing to identify a query topic from analyzing the text content via natural language processing, or in response to determining that the identified query topic does not likely match any of the plurality of different chat bot topics associated with the different series of dialog questions;
 in response to determining that the highest ranked one of the ranked chat bot topics meets the threshold likelihood of matching chat bot topics, presents an automated dialog chat bot on a display device within a graphical user interface structure; and
 presents in series from the automated dialog chat bot a plurality of dialog questions comprising ones of the series of dialog questions associated to the highest ranked one of the ranked chat bot topics and that are selected in response to answer inputs via the graphical user interface to a previous question in the presented chat bot series of dialog questions.

6. The system of claim 5, wherein the processor executes the program instructions stored on the computer-readable storage medium via the computer readable memory and thereby determines that the highest ranked one of the ranked chat bot topics meets the threshold likelihood via a process selected from the group consisting of:
 determining whether time data of the input of the input query text content falls within a promotional sales event period for a time-dependent value of a service provider product, wherein the time data of the input is selected from the group consisting of: a time of day, and a calendar date;
 determining whether a geographic location of the user is located within a geographical region that is associated with a geographic region-dependent value for a service provider product, wherein the geographic location of the user is selected from the group consisting of: a home address of the user, and a business address of the user; and
 determining whether the geographic location of the user meets a threshold qualification for matching the chat bot topic as a function of comparing the time data of the input of the user query text content to a time period of a disqualifying event, wherein the geographic location of the user is selected from the group consisting of: a home address of the user, and a business address of the user.

7. A computer program product for automatically invoking an automated dialog chat bot in response to query text content meeting a threshold relevance, the computer program product comprising:
 a computer readable storage medium having computer readable program code embodied therewith, wherein the computer readable storage medium is not a transitory signal per se, the computer readable program code comprising instructions for execution by a processor that cause the processor to:

in response to an input of a user query text content comprising a plurality of different words, analyze the text content to identify via natural language processing query topics defined by combinations of words and a sentence structure of the text content, comprising making query topic identifications from a limited set of chat bot topics that are each associated with products of a service provider;

in response to determining that a query topic is identified from the analyzing the text content, determine whether the identified query topic likely matches each of a plurality of different chat bot topics that are associated one each with each of different series of dialog questions;

rank each of a plurality of ones of the different chat bot topics that are determined to likely match the identified query topic as a function of different relative values of strength of match of the identified query topic to the ones of the different chat bot topics and to service provider product values that are associated to the ones of the different chat bot topics, wherein the different relative values of strength of match are weighted to more highly rank the ones of the different chat bot topics that are associated to higher service provider product values;

determine that a highest ranked one of the ranked chat bot topics meets a threshold likelihood of matching chat bot topics defined for invoking an automated dialog chat bot;

search a database for results that satisfy keywords in the query input text content or the query topics identified for the query input text content, in response to failing to identify a query topic from analyzing the text content via natural language processing, or in response to determining that the identified query topic does not likely match any of the plurality of different chat bot topics associated with the different series of dialog questions in response to determining that the highest ranked one of the ranked chat bot topics meets the threshold likelihood of matching chat bot topics, present an automated dialog chat bot on a display device within a graphical user interface structure; and present in series a plurality of dialog questions comprising ones of the series of dialog questions associated to the highest ranked one of the ranked chat bot topics and that are selected in response to answer inputs from the graphical user interface to a previous question in the presented chat bot series of dialog questions.

8. The computer program product of claim 7, wherein the computer readable program code instructions for execution by the processor further cause the processor to determine that the highest ranked one of the ranked chat bot topics meets the threshold likelihood via a process selected from the group consisting of:

determining whether time data of the input of the input user query text content is within a promotional sales event period for a time-dependent value of a service provider product, wherein the time data of the input is selected from the group consisting of: a time of day, and a calendar date;

determining whether a geographic location of the user is located within a geographical region that is associated with a geographic region-dependent value for a service provider product, wherein the geographic location of the user is selected from the group consisting of: a home address of the user, and a business address of the user; and determining whether the geographic location of the user meets a threshold qualification for matching the chat bot topic as a function of comparing the time data of the input of the user query text content to a time period of a disqualifying event, wherein the geographic location of the user is selected from the group consisting of: a home address of the user, and a business address of the user.

* * * * *